United States Patent
Ozawa et al.

(10) Patent No.: US 9,227,796 B2
(45) Date of Patent: Jan. 5, 2016

(54) INTERVAL ADJUSTMENT DEVICE AND TRANSPORT DEVICE USING SAME

(71) Applicant: OILES CORPORATION, Tokyo (JP)

(72) Inventors: Hideo Ozawa, Fujisawa (JP); Koichi Tsunoda, Fujisawa (JP); Takahiro Yasuda, Fujisawa (JP); Toshiyuki Ikeda, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 14/391,485

(22) PCT Filed: Mar. 27, 2013

(86) PCT No.: PCT/JP2013/059019
§ 371 (c)(1),
(2) Date: Oct. 9, 2014

(87) PCT Pub. No.: WO2013/157369
PCT Pub. Date: Oct. 24, 2013

(65) Prior Publication Data
US 2015/0117966 A1    Apr. 30, 2015

(30) Foreign Application Priority Data
Apr. 16, 2012 (JP) ................................. 2012-092788

(51) Int. Cl.
*B65G 53/00* (2006.01)
*B65G 51/03* (2006.01)

(52) U.S. Cl.
CPC ...................................... *B65G 51/03* (2013.01)

(58) Field of Classification Search
USPC .......... 406/88; 248/346.05, 581, 594; 33/287; 198/861.1
See application file for complete search history.

(56) References Cited

U.S. PATENT DOCUMENTS 3,912,248 A * 10/1975 Pickford .................. A47C 3/22
                                                       248/562
4,223,762 A *  9/1980 Gertal .................... F16F 9/0281
                                                       188/268

(Continued)

FOREIGN PATENT DOCUMENTS

| JP | 61-124411    | 6/1986  |
| JP | 2009-229258  | 10/2009 |
| JP | 2010-118478  | 5/2010  |

OTHER PUBLICATIONS

International Search Report for PCT/JP2013/059019 mailed May 28, 2013.

*Primary Examiner* — Joseph Dillon, Jr.
(74) *Attorney, Agent, or Firm* — Nixon & Vanderhye P.C.

(57) ABSTRACT

In order to improve workability of an operation to adjust the interval between two members, leveling devices (3) support an air rail (2) on base frames (1), and adjust the height of the air rail (2) with respect to the base frames (1). The leveling devices (3) have: disc spring groups (31) which expand and contract in the height direction of the air rail (2) with respect to the base frames (1); a columnar indenter (32), in which a stepped through-hole (324) for inserting a bolt (4) is formed from one end face (321) to the other end face (323), with a first edge part (322) formed outward on the one end face (321) side; a columnar spring guide (33), in which a through-hole (334) for inserting the bolt (4) is formed from one end face (331) to the other end face (333), with a flange part (332) formed outward on the one end face (331) side; and a tubular housing (34) in which a second edge part (342) is formed inward at one opening (341) thereof.

9 Claims, 7 Drawing Sheets

(56) References Cited

U.S. PATENT DOCUMENTS

| | | | | |
|---|---|---|---|---|
| 4,526,503 A * | 7/1985 | Muraguchi | B25H 1/0007 | 248/580 |
| 4,706,793 A * | 11/1987 | Masciarelli | B65G 47/54 | 193/35 A |
| 4,726,161 A * | 2/1988 | Yaghoubian | E04H 9/023 | 248/585 |
| 4,766,708 A * | 8/1988 | Sing | E04H 9/02 | 248/585 |
| 5,070,987 A * | 12/1991 | Koltookian | B65G 47/8823 | 193/35 A |
| 5,409,192 A * | 4/1995 | Oliver | E04B 1/34352 | 248/357 |
| 5,871,198 A * | 2/1999 | Bostrom | B60N 2/0825 | 248/575 |
| 6,019,154 A * | 2/2000 | Ma | B23K 20/10 | 100/258 R |
| 6,196,376 B1 * | 3/2001 | Grabmann | B65G 21/2054 | 198/837 |
| 6,857,613 B2 * | 2/2005 | Yokota | B60N 2/0232 | 248/429 |
| 7,229,057 B2 * | 6/2007 | Cavell | A47G 25/06 | 211/115 |
| 8,770,383 B2 * | 7/2014 | Matsumoto | B65G 47/8807 | 193/35 A |
| 8,850,753 B2 * | 10/2014 | Tabibnia | E04F 15/02464 | 248/188.2 |
| 8,966,864 B2 * | 3/2015 | Rabec | B65B 59/005 | 198/586 |
| 2006/0243563 A1 * | 11/2006 | Marti Sala | B65G 29/00 | 198/723 |
| 2012/0068035 A1 * | 3/2012 | Iguchi | B65G 39/025 | 248/316.01 |
| 2014/0116838 A1 * | 5/2014 | Ribau | B65G 47/8823 | 193/35 A |

* cited by examiner

INTERVAL ADJUSTMENT DEVICE AND TRANSPORT DEVICE USING SAME

This application is the U.S. national phase of International Application No. PCT/JP2013/059019 filed 27 Mar. 2013 which designated the U.S. and claims priority to Japanese Patent Application No. 2012-092788 filed 16 Apr. 2012, the entire contents of each of which are hereby incorporated by reference.

TECHNICAL FIELD

The present invention relates to an interval adjustment device, and particularly to structure of a leveling device suitable for a floating transportation apparatus that transports an object of transportation in a floated state.

BACKGROUND ART

As a floating transportation apparatus that transports an object such as a substrate used for a flat-panel display (FPD) in a state of being floated above a transportation surface, a substrate transportation apparatus described in the Patent Document 1 is known.

This floating transportation apparatus transports a substrate in the direction of transportation while floating the substrate as the object of transportation by blowing compressed air from transportation surfaces of arranged floating blocks. Here, to allow adjustment of respective heights and flatness of the floating blocks, the floating blocks are fixed on respective movable plates by screws, so that an interval between each movable plate and a fixed plate can be adjusted at three points.

In detail, a movable plate, which projects from both sides of the bottom of each floating block, has female threads at three positions in total. The fixed plate has female threads at positions opposite to the female threads of each movable plate, and a pitch of the female threads of the fixed plate is different from that of the female threads of the movable plate. Further, an adjust screw, which has male thread portions screwable into the female threads of the movable plate and the fixed plate, is screwed into each pair of opposite female threads in a state that the adjust screw is inserted in a spring placed between the movable plate and the fixed plate. A worker can adjust the interval between a movable plate and the fixed plate by inserting a tool between adjacent floating blocks and turning an adjust screw so as to increase or decrease the interval by the distance corresponding to the difference between the pitches of the female threads of both the plates.

CITATION LIST

Patent Literature

Patent Literature 1: Japanese Unexamined Patent Application Laid-Open No. 2009-229258

SUMMARY OF INVENTION

Technical Problem

In the substrate transportation apparatus described in the Patent Document 1, to fix a movable plate to the fixed plate, a worker has to place a spring around an adjust screw inserted in a female thread of the movable plate, and has to position the tip of the adjust screw at the corresponding female thread of the fixed plate while holding the spring to keep them from dropping off. Thus, its workability is not good.

Further, it is necessary to ensure space on both sides of a floating block for a worker to do fastening or loosening work on an adjust screw, and thus it is impossible to narrow the gap between adjacent floating blocks further and to make adjacent floating blocks contact closely with each other. Accordingly, at a location of a gap between adjacent floating blocks, it is impossible to blow compressed air onto an object of transportation under good conditions, and it can lead to an unstable floating state of the object of transportation.

The present invention has been made considering the above situation. And an object of the present invention is to provide a technique that improves workability of adjustment of an interval between two members.

Solution to Problem

To solve the above problem, the present invention provides an interval adjustment device for adjusting an interval between two members, in which a plurality of component parts including an elastic body or the like has unit structure that allows easy assembling, and which fixing of one member to the other member and adjusting of the interval between the two members can be performed by using one bolt.

For example, the present invention provides an interval adjustment device, which is placed between two members for adjusting an interval between the two members, comprising:

an elastic body, which expands and contracts in a direction of the interval;

a presser of a tubular shape, which comprises: a stepped through-hole formed from one end face toward other end face to have a large-diameter portion on a side of the one end face and a small-diameter portion on a side of the other end face; and a first edge portion formed outward on the side of the one end face;

a guide member of a tubular shape, which comprises: a columnar portion having a through-hole formed to run from one end face to other end face, a side of the other end face being inserted into the large-diameter portion of the stepped through-hole; and a flange portion formed outward at the one end face of the columnar portion; and a housing of a tubular shape, in which a second edge portion is formed inward at one opening portion; and wherein, the housing is placed between the two members such that other opening portion on an opposite side to the one opening portion faces one member between the two members;

the presser is housed in the housing such that the first edge portion is in contact with the second edge portion and the other end face of the presser projects from the one opening portion of the housing to abut against the other member between the two members;

the side of the other end face of the columnar portion of the guide member is inserted into the large-diameter portion of the stepped through-hole of the presser housed in the housing, so that an axis of the through-hole coincide with an axis of the stepped through-hole, and a hollow portion of a tubular shape is formed by an inner surface of the housing, a side surface of the guide member, the first edge portion, and the flange portion; and the elastic body is placed in the hollow portion so that the guide member is biased in the direction of being pushed out from the other opening portion of the housing so as to be pressed against the one member between the two members.

Advantageous Effects of Invention

The present invention can improve workability of operation of adjusting an interval between two members.

DESCRIPTION OF EMBODIMENTS

In the following, one embodiment of the present invention will be described.

Figure 1:
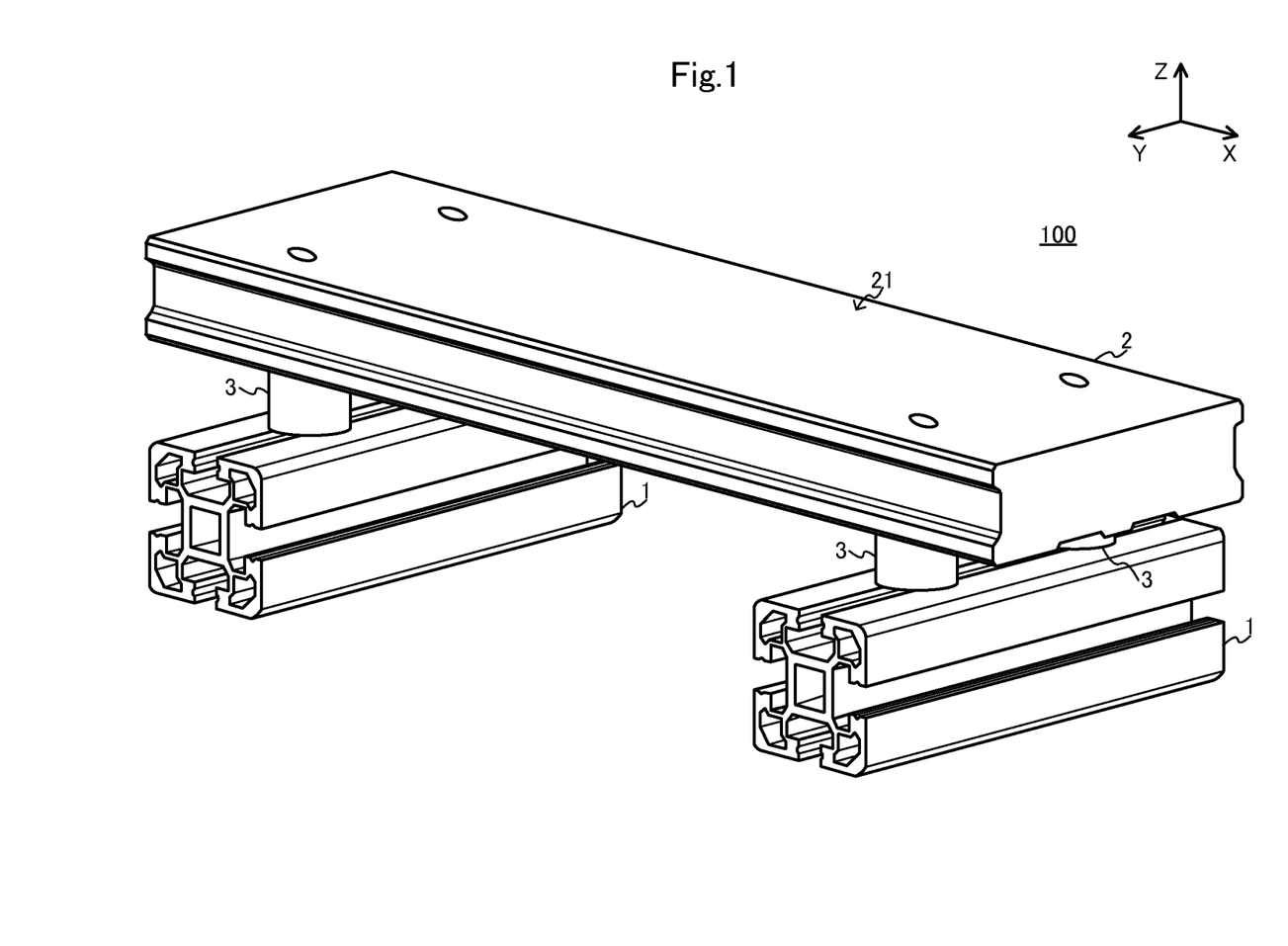
FIG. 1 is an external view showing a general configuration of a transportation platform 100 of a floating transportation apparatus according to an embodiment of the present invention.

FIG. 1 is an external view showing a general configuration of a transportation platform 100 of a floating transportation apparatus according to one embodiment of the present invention.

As shown in the figure, the floating transportation apparatus of the present embodiment comprises the transportation platform 100 for transporting an object such as a glass substrate used for an FPD, a solar battery panel or the like in a state of floating from a transportation surface 21. The transportation platform 100 comprises: two base frames (for example, aluminum frames) 1 of rectangular column shapes, which are arranged side by side with a prescribed space between them; an air rail 2 of a plate shape, which is placed to extend over the two base frames 1; and two leveling devices 3 (partially not shown) for each base frame 1 (namely, four leveling devices 3 in total). The present embodiment shows an example in which one air rail 2 is placed over two base frames 1. However, in practice, a plurality of air rails 2 are placed over two base frames 1 each having the length of the transportation distance for example, being placed side by side in the longitudinal direction (Y direction in FIG. 1) of the base frames 1. Further, although in the present embodiment one air rail 2 is supported by the four leveling devices 3, it is sufficient to use the leveling devices 3 to the number that can support the air rail 2 stably.

Figure 7:
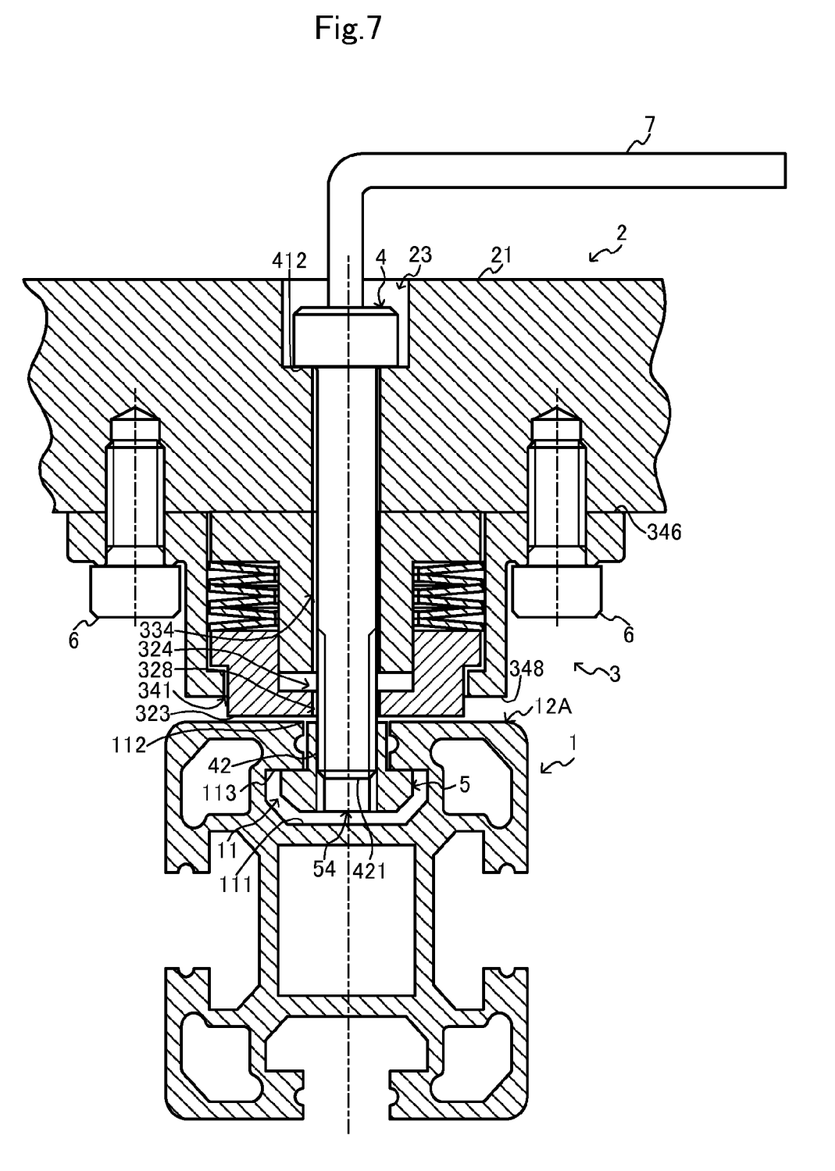
FIG. 7 is a cross-section view for explaining work of fixing the air rail 2 to the base frame 1.

Although not shown in FIG. 1, the transportation platform 100 further comprises: bolts 6 for fixing the leveling devices 3 to the air rail 2; hexagon socket head bolts 4 and T-nuts 5 for fixing the air rail 2 to the base frames 1 via the leveling devices 3 (See FIG. 7). As for the bolts 6, two bolts 6 are used for each leveling device 3. Further, a hexagon socket head bolt 4 and a T-nut 5 are used as a pair for each leveling device 3 (i.e. four pairs in total are used in one air rail 2).

Figure 2:
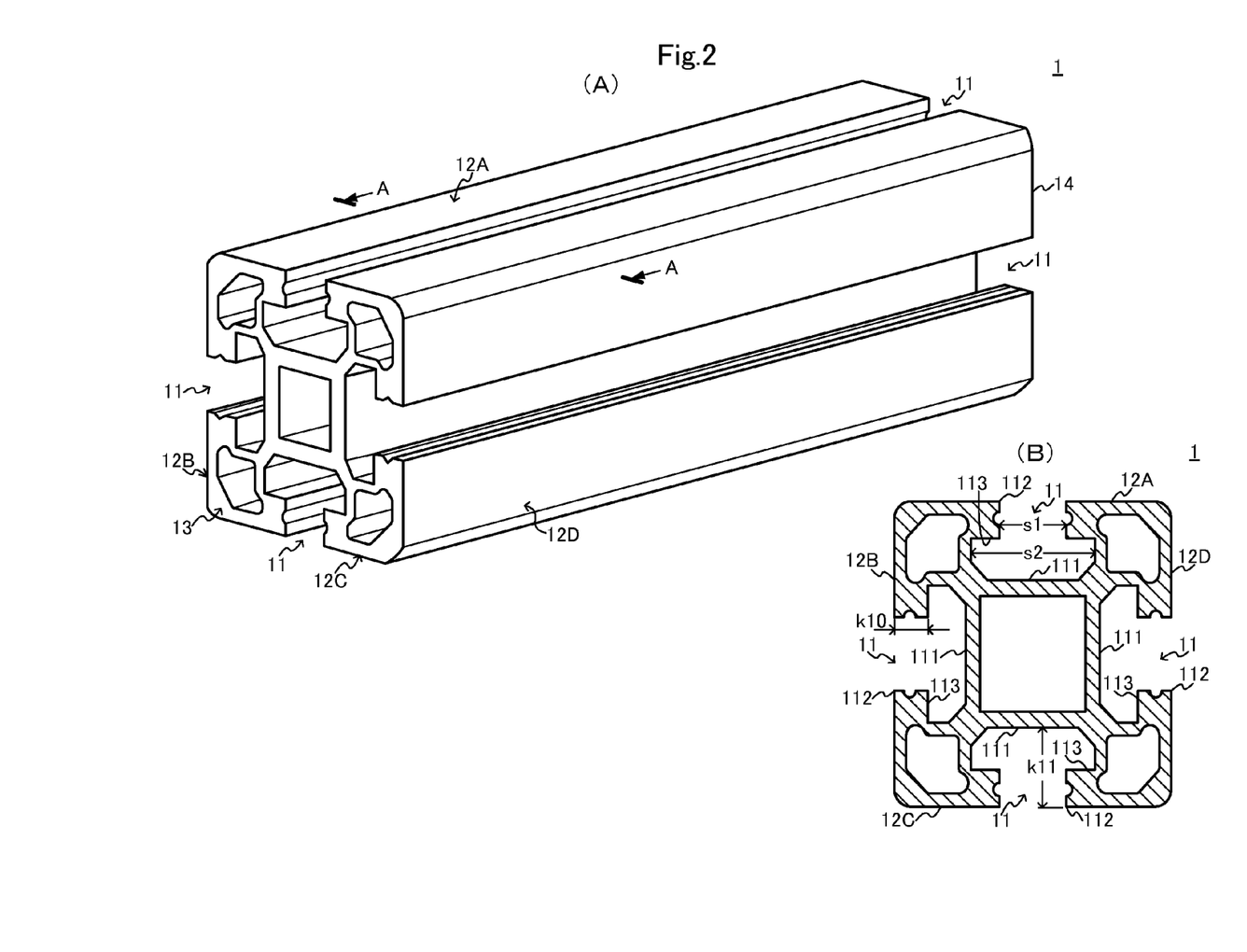
FIG. 2(A) is an external view showing a base frame 1.
FIG. 2(B) is an A-A cross-section view of the base frame 1 shown in FIG. 2(A)

FIG. 2(A) is an external view of a base frame 1, and FIG. 2(B) is an A-A cross-section view of the base frame 1 shown in FIG. 2(A).

As shown in the figure, in each of four outer surfaces (an upper surface 12A, a left side surface 12B, a lower surface 12C and a right side surface 12D) of the base frame 1, is formed a T-shaped groove 11 for placing a T-nut 5 at a desired position in the longitudinal direction of the base frame 1. The T-shaped groove 11 has a T-shaped cross-section including a step 113 at which the groove width changes from s1 to s2 (>s1) between a groove edge 112 and a groove bottom 111. The T-shaped groove 11 continues from one end face (a face perpendicular to the longitudinal direction) 13 of the base frame 1 to the other end face 14. By this T-shaped groove 11, are formed T-shaped openings in both end faces 13, 14 of the base frame 1. Thus in each of the four outer surfaces 12A-12D, an opening of the groove width s1 continuing from the one end face 13 to the other end face 14 is formed.

As the base frame 1, the present embodiment uses a four-grooved-surface type frame, which has four outer surfaces 12A-12D in each of which the T-shaped groove 11 is formed. However, as the base frame 1, it is possible to use a frame in which the T-shaped groove 11 is formed at least in the upper surface 12A facing the air rail 2.

Figure 3:
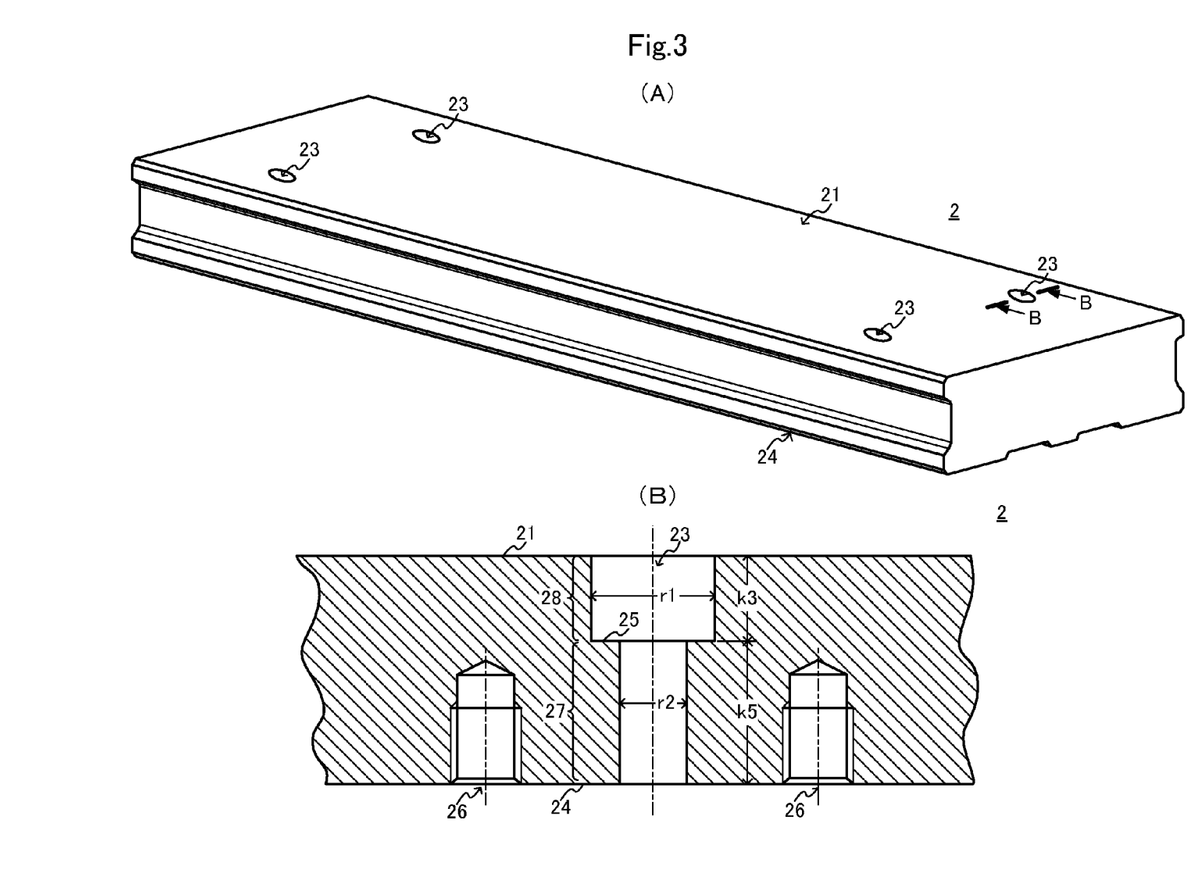
FIG. 3(A) is an external view showing an air rail 2.
FIG. 3(B) is an enlarged B-B cross-section view of the air rail 2 shown in FIG. 3(A)

FIG. 3(A) is an external view of the air rail 2, and FIG. 3(B) is an enlarged B-B cross-section view of the air rail 2 shown in FIG. 3(A).

The air rail 2 blows compressed air from a plurality of air blowing holes (not shown) of the transportation surface 21 through an air supply path (not shown) in the inside of the air rail 2. Here, the compressed air is supplied from the outside of the air rail 2 to an air supply opening (not shown) of the air rail 2.

Figure 5:
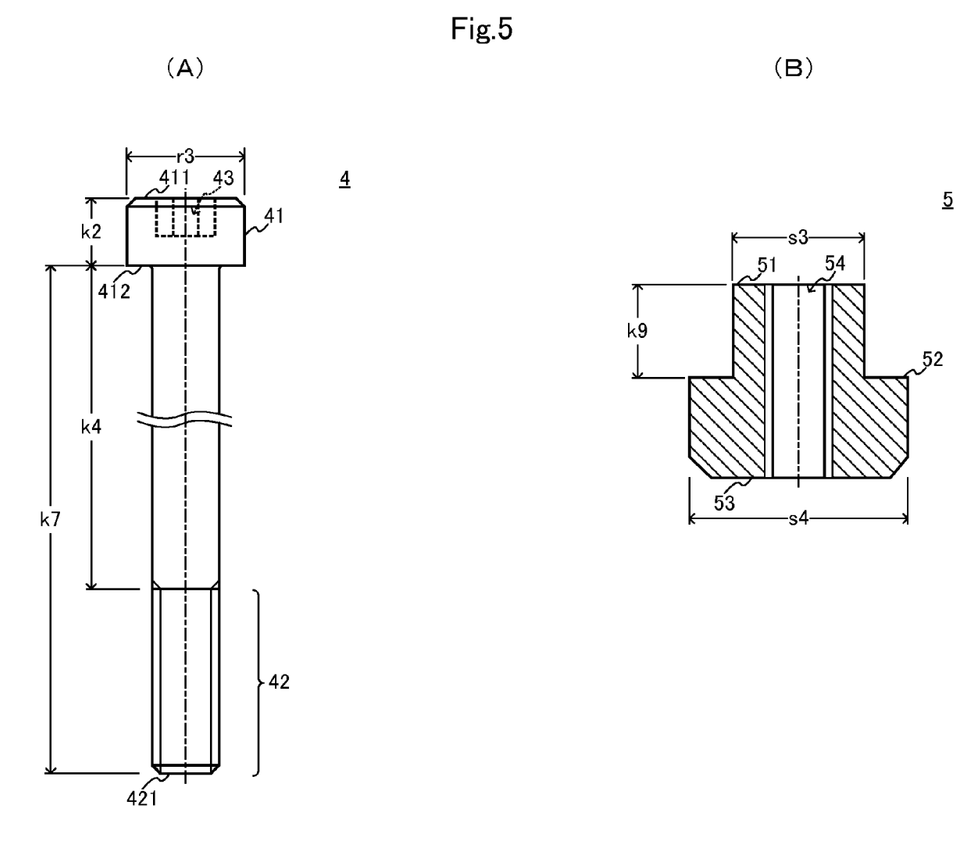
FIG. 5(A) is an external view showing a hexagon socket head bolt 4.
FIG. 5(B) is a cross-section view of a T-nut 5.

As shown in the figure, at mounting positions (four positions in the present embodiment) of the air rail 2 to the base frames 1, are formed height-adjustment bolt holes 23 for inserting hexagon socket head bolts 4 from the transportation surface 21 toward the back surface (i.e. the surface on the opposite side from the transportation surface 21) 24, respectively. In each height-adjustment bolt hole 23, is formed a step 25 to come in contact with a seating surface 412 (See FIG. 5) of a hexagon socket head bolt 4 which is inserted into this height-adjustment bolt hole 23 from the side of the transportation surface 21. The diameter r1 in the area (a large-diameter portion) 28 from the transportation surface 21 to the step 25 is larger than the diameter r2 in the area (a small-diameter portion) 27 from the step 25 to the back surface 24.

Further, in the back surface 24 of the air rail 2, on both sides of each height-adjustment bolt hole 23, are formed threaded holes 26 into which bolts 6 are respectively screwed.

In the present embodiment, the height-adjustment bolt holes 23 are formed at the mounting positions of the air rail 2 to the base frames 1. However, to make the mounting positions of the air rail 2 to the base frames 1 adjustable, stepped elongate holes of any length having a cross-sectional shape similar to that of the height-adjustment bolt hole 23 may be formed for example in the longitudinal direction of the air rail 2.

Figure 4:
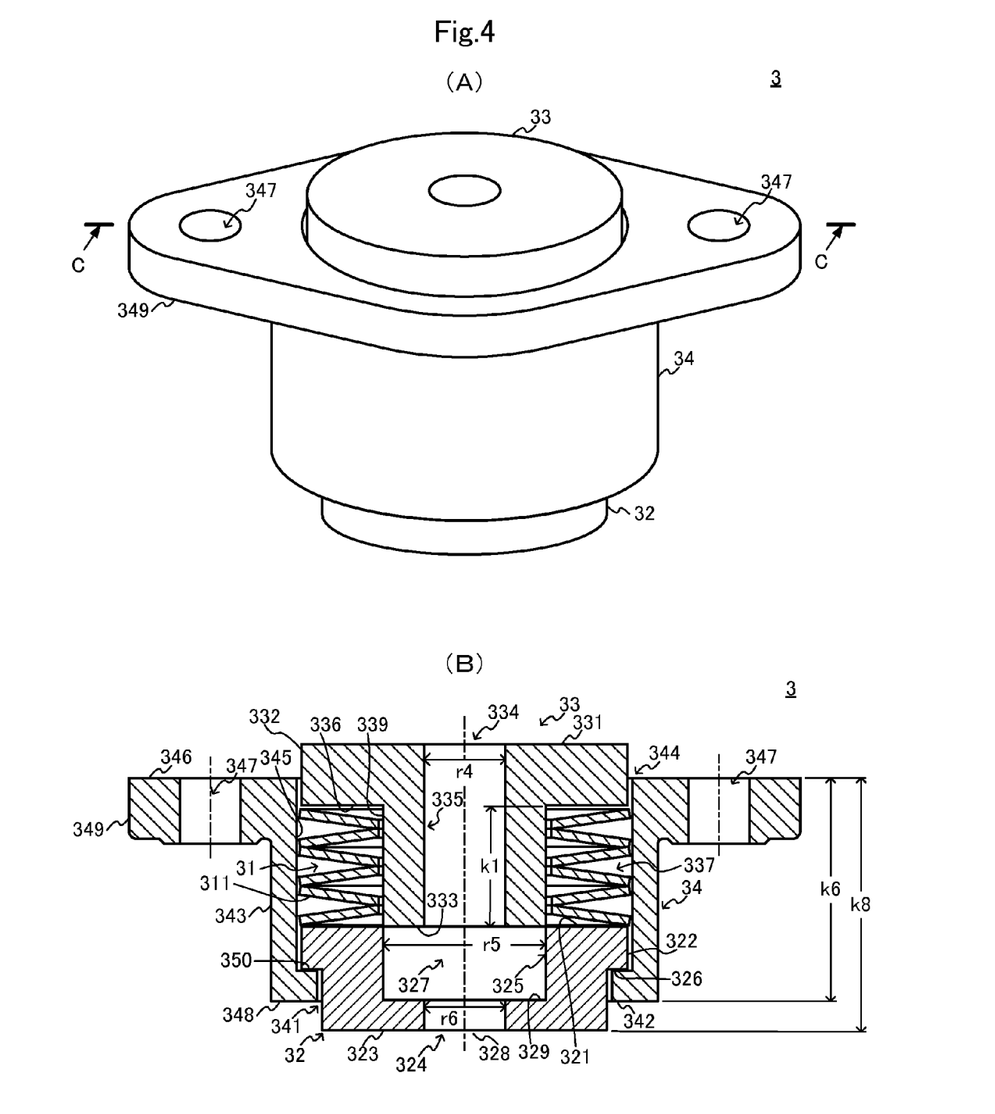
FIG. 4(A) is an external view showing a leveling device 3.
FIG. 4(B) is a C-C cross-section view of the leveling device 3 shown in FIG. 4(A)

FIG. 4(A) is an external view of the leveling device 3, and FIG. 4(B) is a C-C cross section view of the leveling device shown in FIG. 4(A).

Each leveling device 3 supports the air rail 2 on the base frames 1, and adjusts the height of the air rail 2 relative to the base frames 1.

As shown in the figure, each leveling device 3 comprises: a disc spring group 31 that expands and contracts in the height direction (Z direction in FIG. 1) of the air rail 2 relative to a base frames 1; a presser 32 of a tubular shape with an edge portion, which is biased by the disc spring group 31 to be pressed against the upper surface 12A of the base frame 1; a spring guide 33 of a tubular shape with a flange portion, which is pressed against the back surface 24 of the air rail 2 biased by the disc spring group 31; and a housing 34 of a tubular shape with a flange portion and a edge portion, which houses these parts 31-33.

The housing 34 comprises: a tubular portion 343; a second edge portion 342 formed along the inner periphery of an opening portion 341 on the side of one end face (the bottom surface 348 of the housing 34) of the tubular portion 343 so as to protrude toward the inside of the tubular portion 343; and a flange portion 349 formed on the side of the other end face (the upper surface 346 of the housing 34) of the tubular portion 343 so as to protrude outward from the outer periphery of the tubular portion 343.

The housing 34 is placed between the base frame 1 and the air rail 2, such that the upper surface 346 comes in contact with the back surface 24 of the air rail 2 in a state that an opening portion 344 on the side of the upper surface 346 faces a height-adjustment bolt hole 23 of the air rail 23. Further, in the flange portion 349, at positions corresponding to threaded holes 26 in the back surface 24 of the air rail 2, are formed through-holes 347 into which bolts 6 are inserted respectively.

The presser 32 comprises: a circular-cylinder portion 325, which protrudes toward the side of the base frame 1 from the opening portion 341 on the side of the bottom surface 348 of the housing 34; and a first edge portion 322 formed on the side of one end face (the upper surface 321 of the presser 32) of the circular-cylinder portion 325, so as to protrude outward from the outer periphery of the circular-cylinder portion 325. In the circular-cylinder portion 325, a stepped through-hole 324 is formed from the one end face (the upper surface 321 of the presser 32) toward the other end face (the bottom surface 323). And the stepped through-hole 324 has an axis in common with the circular-cylinder portion 325. This stepped through-hole 324 has a large-diameter portion 327 on the side of the one end face 321 and a small-diameter portion 328 on the side of the other end face 323. In the inside of the large-diameter portion 327 of the stepped through-hole 324, is inserted the below-described circular-cylinder portion 335 of the spring guide 33. The large-diameter portion 327 guides this circular-cylinder portion 335 in the direction (Z direction in FIG. 1) of expansion and contraction of the disc spring group 31. Further, a hexagon socket head bolt 4 is inserted through the small-diameter portion 328 (See FIG. 7).

The presser 32 is housed in the housing 34 in a state that the lower surface 326 of the first edge portion 322 is in contact with the upper surface 350 of the second edge portion 342 of the housing 34, and the bottom surface 323 projects toward the base frame 1 from the opening portion 341 on the side of the bottom surface 348 of the housing 34.

Figure 6:
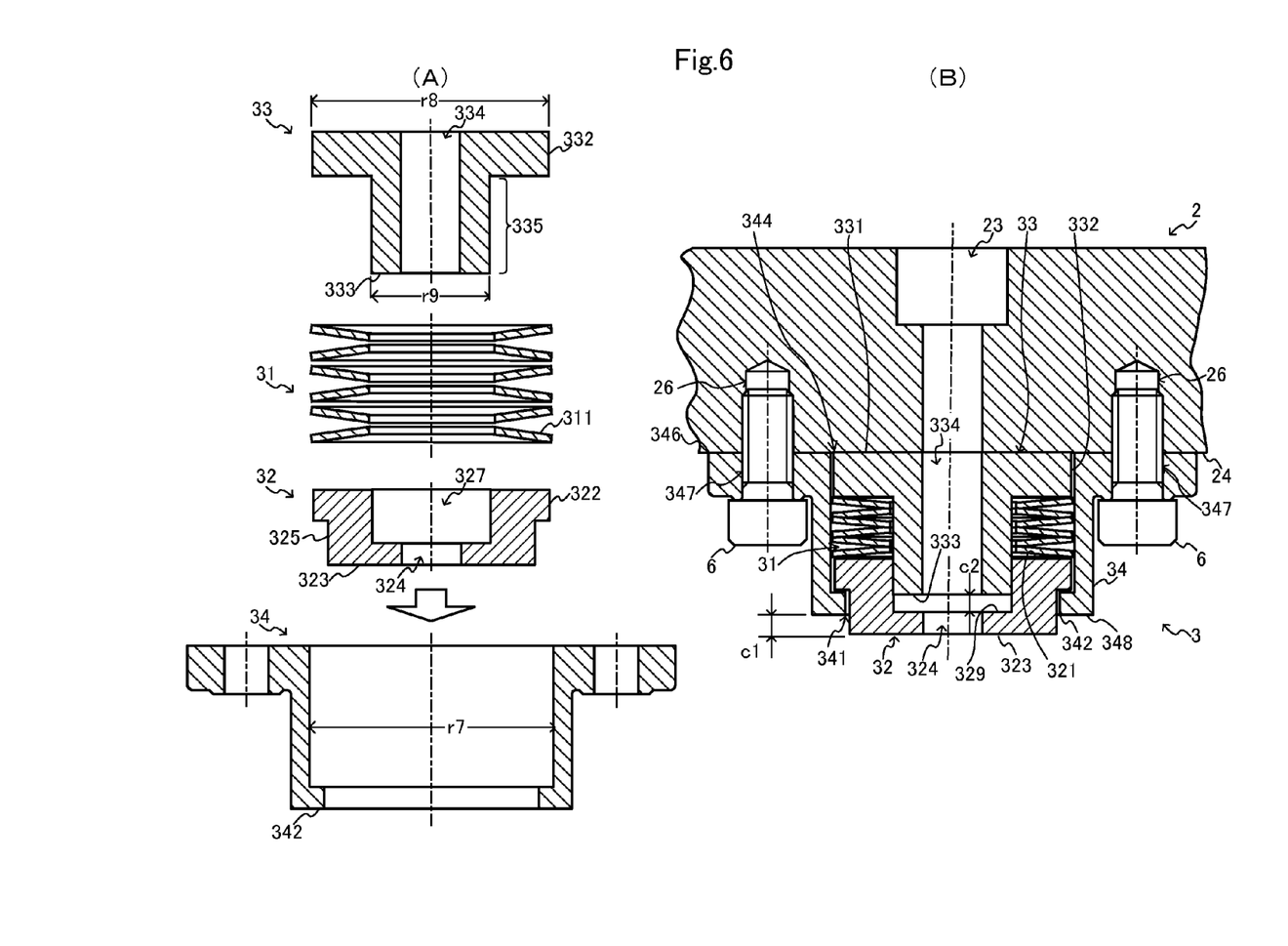
FIG. 6(A) is a cross-section view for explaining assembling work of the leveling device 3.
FIG. 6(B) is a cross-section view for explaining work of fixing the leveling device 3 to the air rail 2.

The spring guide 33 comprises: a circular-cylinder portion 335, which is inserted into the disc spring group 31 in the housing 34 and the large-diameter portion 327 of the stepped through-hole 324 of the presser 32; and a flange portion 332, which is formed on the side of the one end face (the upper surface 331 of the spring guide 33) of the circular-cylinder portion 335 so as to protrude outward from the outer periphery of the circular-cylinder portion 335. And the flange portion 332 presses the disc spring group 31 between the flange portion 332 and the upper surface 321 of the presser 32 in the housing 34. The flange portion 332 is formed into a disk shape concentric with the circular-cylinder portion 335, and has an outer diameter r8 (See FIG. 6) that is smaller than the inner diameter r7 of the tubular portion 343 of the housing 34 to the extent that the flange portion 332 is smoothly guided in the direction of expansion and contraction of the disc spring group 31 in the inside of the tubular portion 343. In the circular-cylinder portion 335, is formed a through-hole 334 through which the hexagon socket head bolt 4 is inserted from the upper surface 331 of the spring guide 33 toward the bottom surface 333 so as to be concentric with the circular-cylinder portion 335. The circular-cylinder portion 335 has an outer diameter r9 that is set smaller than the inner diameter r5 (See FIG. 6) of the large-diameter portion 327 of the stepped through-hole 324 of the presser 32 to the extent that the circular-cylinder portion 335 is smoothly guided in the direction of expansion and contraction of the disc spring group 31 in the inside of the large-diameter portion 327. Further, the inner diameter r4 of the through-hole 334 of the circular-cylinder portion 335 is set larger than the inner diameter r6 of the small-diameter portion 328 of the stepped through-hole 324 of the presser 32. In the present embodiment, the inner diameter r4 of the through-hole 334 is set as nearly same as the inner diameter r6 of the small-diameter portion 328 of the stepped through-hole 324.

When the circular-cylinder portion 335 of the spring guide 33 is inserted into the large-diameter portion 327 of the stepped through-hole 324 of the presser 32 housed in the housing 34, then a hollow portion 337 of a tubular shape is formed by the outer peripheral surface 339 of the circular-cylinder portion 335, the lower surface 336 of the flange portion 332, the inner surface 345 of the housing 34, and the upper surface 321 of the presser 32. Although details will be described later, only by inserting the flange portion 332 of the spring guide 33 into the inside of the tubular portion 343 of the housing 34, the circular-cylinder portion 335 of the spring guide 33 can be positioned relative to the large-diameter portion 327 of the stepped through-hole 324 of the presser 32. By this, the circular-cylinder portion 335 is smoothly inserted into the large-diameter portion 327, and the axis of the through-hole 334 of the circular-cylinder portion 335 becomes almost coincident with the axis of the stepped through-hole 324 of the presser 32. Accordingly, at the time of fixing the air rail 2 to the base frame 1, it is possible to eliminate operation for center alignment of insertion holes (the through-hole 334 of the spring guide 33 and the small-diameter portion 328 of the stepped through-hole 324 of the presser 32) for the hexagon socket head bolt 4.

Here, the length k1 between the bottom surface 333 of the circular-cylinder portion 335 of the spring guide 33 and the lower surface 336 of the flange portion 332 is set to a value that allows formation of a gap between the bottom surface 333 of the spring guide 33 and a step surface 329, when the upper surface 331 of the spring guide 33 is aligned with the upper surface 346 of the housing 34. The gap is larger than a height-adjusting allowance for the air rail 2. The step surface 329 is located between the large-diameter portion 327 and the small-diameter portion 328 of the stepped through-hole 324 of the presser 32.

The disc spring group 31 consists of a plurality of disc springs 311 that are layered in the hollow portion 337 of the tubular shape in the height direction of the air rail 2 in relation to the base frame 1. The disc springs 311 are layered to the number at which the free height of the disc spring group 31 is larger than the distance between the lower surface 336 of the flange portion 332 and the upper surface 321 of the presser 32, in the case where the upper surface 331 of the spring guide 33 is aligned with the upper surface 346 of the housing. Namely, the disc springs 311 are layered to the number at which the upper surface 331 of the spring guide 33 projects from the opening portion 334 on the side of the upper surface 346 of the housing 34 in an unloaded state of the disc spring group 31. In the present embodiment, disc springs 311 are layered such that adjacent disc springs 311 are directed in opposite directions (the so-called serial combination system). Alternatively, however, the plurality of disc springs 311 may be layered such that adjacent disc springs 311 are directed in the same direction (the so-called parallel combination system), or a combination of the serial system and the parallel system may be employed. Further, although six disc springs 311 are layered in the present embodiment, the number of disc springs for use can be changed suitably as far as the disc spring group 31 is compressed between the lower surface 336 of the flange portion 332 and the upper surface 321 of the presser 32 when the spring guide 33 is pressed until the upper surface 331 of the spring guide 33 is aligned with the upper surface 346 of the housing 34.

The disc spring group 31 biases the presser 32 in the direction of pushing out from the opening portion 341 on the side of the bottom surface 348 of the housing 34 so as to press the presser 32 against the upper surface 12A of the base frame 1. At the same time, the disc spring group 31 biases the spring guide 33 in the direction of pushing out from the opening portion 344 on the side of the upper surface 346 of the housing 34 so as to press the spring guide 33 against the back surface 24 of the air rail 2. Further, the disc spring group 31 has the allowable load and the spring constant which are sufficient for stably supporting a load (such as loads of the transported object, the air rail 2 and the like on each leveling device 3) to bear during transportation of the object. Instead of the disc spring group 31, another elastic body (such as a coil spring, rubber of a tubular shape, or the like) can be used as far as the elastic body has such elasticity.

The present embodiment uses the spring guide 33 of the tubular shape with flange portion, the presser 32 of the tubular shape with edge portion, and the housing 34 of the tubular shape with flange portion and edge portion. However, it is possible to use a spring guide 33, a presser 32 and a housing 34 of other three-dimensional shapes that prevent displacement of the axis of the disc spring group 31.

FIG. 5(A) is the external view of a hexagon socket head bolt 4.

As shown in the figure, in the upper surface 411 of a head portion 41 of the hexagon socket head bolt 4, is formed a hexagon socket 43 for a hexagon wrench. The diameter r3 of the head portion 41 of the hexagon socket head bolt 4 is smaller than the diameter r1 of the large-diameter portion 28 of the height-adjustment bolt hole 23 of the air rail 2 and larger than the diameter r2 of the small-diameter portion 27. Further, the thickness k2 of the head portion 41 of the hexagon socket head bolt 4 is smaller than the length k3 (See FIG. 3(B)) of the large-diameter portion 28 of the height-adjustment bolt hole 23 of the air rail 2. As a result, when the hexagon socket head bolt 4 is inserted into the height-adjustment bolt hole 23 from the side of the transportation surface 21 of the air rail 2, the seating surface 412 of the head portion 41 comes in contact with the step 25 of the height-adjustment bolt hole 23 in the position where the head portion 41 is under the transportation surface 21. Thus the head portion 41 is completely contained in the large-diameter portion 28 of the height-adjustment bolt hole 23.

Further, the length k4 from the seating surface 412 of the hexagon socket head bolt 4 to a threaded portion 42 of the hexagon socket head bolt 4 is smaller than the sum of the length k5 (See FIG. 3(B)) of the small-diameter portion 27 of the height-adjustment bolt hole 23 of the air rail 2 and the height (the length from the opening portion 341 to the opening portion 344) k6 (See FIG. 4(B)) of the housing 34 of the leveling device 3. Further, as shown in FIG. 4(B), in a state that the first edge portion 322 of the presser 32 is in contact with the second edge portion 342 of the housing 34 and the bottom surface 323 of the presser 32 projects from the opening 341 of the housing 34, the length k7 from the seating surface 412 of the hexagon socket head bolt 4 to the tip 421 of the threaded portion 42 is bigger than the sum of the length k8 from the bottom surface 323 of the presser 32 to the upper surface 346 of the housing 34, the length k5 of the small-diameter portion 27 of the height-adjustment bolt hole 23 of the air rail 2 and the depth k10 (See FIG. 2(B)) from the groove edge 112 of the T-shaped groove 11 of the base frame 1 to the step 113, and the length k7 is smaller than the sum of the above-mentioned k8 and k5 and the depth k11 (See FIG. 2(B)) from the groove edge 112 of the T-shaped groove 11 of the base frame 1 to the groove bottom 111.

FIG. 5(B) is a cross-section view of the T-nut 5.

As shown in the figure, the T-nut 5 has a T-shaped cross-section including a step 52 at which the width changes from s3 to s4 (>s3) between one end face (the upper surface 51) and the other end face (the bottom surface 53). Further, in the T-nut 5, there is formed a threaded hole 54 running through from the upper surface 51 to the bottom surface 53, into which the threaded portion 42 of the hexagon socket head bolt 4 is screwed. The width s3 in the area from the upper surface 51 to the step 52 is smaller than the groove width s1 (See FIG. 2(B)) of the T-shaped groove 11 of the base frame 1 in the area from the groove edge 112 of the T-shaped groove 11 to the step 113. The width s4 in the area from the step 52 to the bottom surface 53 is larger than the groove width s1 of the T-shaped groove 11 of the base frame 1 in the area from the groove edge 112 of the T-shaped groove 11 to the step 113, and smaller than the groove width s2 (See FIG. 2(B)) in the area from the step 113 of the T-shaped groove 11 to the groove bottom 111. Further, the height k9 from the step 52 to the upper surface 51 is not larger than the depth k10 (See FIG. 2(B)) from the groove edge 112 of the T-shaped groove 11 of the base frame 1 to the step 113. Thus, the T-nut 5 can be placed at a desired position in the T-shaped groove 11 of the base frame 1. Further, when the threaded portion 42 of the hexagon socket head bolt 4 is screwed into the threaded hole 54 so as to apply force in the direction from the groove bottom 111 of the T-shaped groove 11 to the groove edge 112, the step 52 comes in contact with the step 113 of the T-shaped groove 11 and is fixed to the base frame 1.

Next, operation of fixing the air rail 2 to a base frame 1 will be described.

FIG. 6(A) is a cross-section view for explaining assembling work of the leveling device 3, and FIG. 6(B) is a cross-section view for explaining work of fixing the leveling device 3 to the air rail 2. Further, FIG. 7 is a cross-section view for explaining work of fixing the air rail 2 to the base frame 1.

(1) Assembling of a Leveling Device 3

The leveling devices 3 of the number (four in the present embodiment) required for fixing the air rail 2 to the base frames 1 are previously assembled. Details will be described in the following.

As shown in FIG. 6(A), the presser 32 is inserted into the tubular portion 343 of the housing 34 from the side of the bottom surface 323 so that the first edge portion 322 of the presser 32 abuts against the second edge portion 342 of the housing 34. The circular-cylinder portion 325 and the stepped through-hole 324 of the presser 32 are formed to be concentric with each other. Thus when the presser 32 is simply inserted into the tubular portion 343 of the housing 34, the inner peripheral surface of the second edge portion 342 of the housing 34 comes in contact with the outer peripheral surface of the circular-cylinder portion 325 of the presser 32. By this, the stepped through-hole 324 of the circular-cylinder portion 325 of the presser 32 is axially aligned with the tubular portion 343 of the housing 34. Next, a plurality of disc springs 311 are layered on the presser 32 housed in the housing 34, such that adjacent disc springs 311 are directed in opposite directions. Then, the spring guide 33 is inserted into the housing 34 from the side of the bottom surface 333 so that the circular-cylinder portion 335 of the spring guide 33 is inserted into the disc spring group 31 and the large-diameter portion 327 of the stepped through-hole 324 of the presser 32. Here, the circular-cylinder portion 335 and the flange portion 332 of the spring guide 33 are formed to be concentric. Thus when the spring guide 33 is simply inserted into the tubular portion 343 of the housing 34 up to the flange portion 332 of the spring guide 33, the circular-cylinder portion 335 of the spring guide 33 is positioned relative to the large-diameter portion 327 of the stepped through-hole 324 of the presser 32. Thus, the circular-cylinder portion 335 of the spring guide 33 can be smoothly inserted into this large-diameter portion 327. Here, the circular-cylinder portion 335 and the through-hole 334 of the spring guide 33 are formed to be concentric. Thus when the circular-cylinder portion 335 of the spring guide 33 is inserted into the large-diameter portion 327 of the stepped through-hole 324 of the presser 32, the presser 32, the disc spring group 31 and the spring guide 33 are housed in this order in the housing 34 in a state that the through-hole 334 of the spring guide 33 is axially nearly aligned with the stepped through-hole 324 of the presser 32. By this, the leveling device 3 as shown in FIGS. 4(A) and 4(B) is completed.

(2) Fixing of the Leveling Devices 3 to the Air Rail 2

As shown in FIG. 6(B), for each leveling device 3, two bolts 6 are screwed into threaded holes 26 in the back side 24 of the air rail 2 through the through-holes 347 of the housing 34. As a result, the upper surface 346 of the housing 34 abuts against the back surface 24 of the air rail 2 in a state that the axes of the through-hole 334 of the spring guide 33 and the stepped through-hole 324 of the presser 32 are nearly aligned with the axis of the height-adjustment bolt hole 23 of the air rail 2. By this, the leveling device 3 is fixed to the back side 24 of the air rail 2.

As a result, the spring guide 33 is pushed into the housing 34 so that the upper surface 331 of the spring guide 33 comes to the same level as the upper surface 346 of the housing 34, and preload is applied on the disc spring group 31. In this state, the length of the projected portion of the presser 32 out of the bottom surface 348 of the housing 34 is referred to as c1, and the length from the bottom surface 333 of the spring guide 33 to the step surface 329 between the large-diameter portion 327 and the small-diameter portion 328 of the presser 32 is referred to as c2.

(3) Fixing of the Air Rail 2 to the Base Frames 1 and Height Adjustment

The air rail 2 is placed so as to bridge between two base frames 1. Two T-nuts 5 are inserted in the T-shaped groove 11 on the side of the upper surface 12A of each base frame 1, and located at positions corresponding to height-adjustment bolt holes 23 of the air rail 2. Next, as shown in FIG. 7, for each height-adjustment bolt hole 23 of the air rail 2, the hexagon socket head bolt 4 is inserted from the side of the transportation surface 21 of the air rail 2 through the height-adjustment bolt hole 23, the through-hole 334 of the spring guide 33, and the small-diameter portion 328 of the stepped through-hole 324 of the presser 32. Then, the threaded portion 42 of the hexagon socket head bolt 4 is screwed into the threaded hole 54 of the T-nut 5 by using a hexagon wrench 7. Thus, the air rail 2 is fixed to the base frames 1 through the leveling devices 3 in a state that, for each leveling device 3, the bottom surface 323 of the presser 32 (which projects from the opening portion 341 on the side of the bottom surface 348 of the housing 34 toward the base frame 1) abuts against the upper surface 12A of the base frame 1.

As described above, the length k4 (See FIG. 5(A)) from the seating surface 412 of the head portion 41 of the hexagon socket head bolt 4 to the threaded portion 42 is smaller than the sum of the length k5 (See FIG. 3(B)) of the small-diameter portion 27 of the height-adjustment bolt hole 23 of the air rail 2 and the height k6 (See FIG. 4(B)) of the housing 34 of the leveling device 3. Here, the height k6 is the length from the opening portion 341 to the opening portion 344. Further, in a state that the first edge portion 322 of the presser 32 is in contact with the second edge portion 342 of the housing 34 and the bottom surface 323 of the presser 32 projects from the opening 341 of the housing 34, the length k7 (See FIG. 5(A)) from the seating surface 412 of the hexagon socket head bolt 4 to the tip 421 of the threaded portion 42 is larger than the sum of the length k8 (See FIG. 4(B)) from the bottom surface 323 of the presser 32 to the upper surface 346 of the housing 34, the length k5 (See FIG. 3(B)) of the small-diameter portion 27 of the height-adjustment bolt hole 23 of the air rail 2 and the depth k10 (See FIG. 2(B)) from the groove edge 112 of the T-shaped groove 11 of the base frame 1 to the step 113. And the length k7 is smaller than the sum of the above-mentioned k8 and k5 and the depth k11 (See FIG. 2(B)) from the groove edge 112 of the T-shaped groove 11 of the base frame 1 to the groove bottom 111.

Accordingly, by adjusting the degree of screwing of the hexagon socket head bolt 4 into the T-nut 5, it is possible to adjust the height of the air rail 2 relative to the base frame 1 within the height-adjusting allowance (the smallest length among c1 and c2 shown in FIG. 6(B) and the maximum shrinkage of the disc spring group 31). Leveling of the transportation surface 21 of the air rail 2 can be performed by doing this height adjustment work for each of the four leveling devices 3 used for fixing the air rail 2 to the base frames 1.

Hereinabove, one embodiment of the present invention has been described.

With regard to the leveling device 3 according to the present embodiment, the disc spring group 31, the presser 32 and the spring guide 33 are housed in the housing 34, to realize unitization of a plurality of component parts including the disc spring group 31, the presser 32, the spring guide 33 and the housing 34. Accordingly, it is possible to assemble the required number of leveling devices 3 in advance of fixing the air rail 2 to the base frames 1. Thus, a worker can easily fix the leveling devices 3 to the air rail 2 without caring about falling of some parts, and thus the work efficiency is improved.

Further, in assembly work of the leveling device 3, the circular-cylinder portion 335 of the spring guide 33 is simply inserted into the large-diameter portion 327 of the stepped through-hole 324 of the presser 32 via the disc spring group 31, so that the through-hole 334 of the spring guide 33 is axially aligned with the stepped through-hole 324 of the presser 32. Accordingly, there is no need of alignment work of the insertion holes (the through-hole 334 of the spring guide 33 and the small-diameter portion 328 of the stepped through-hole 324 of the presser 32) for the hexagon socket head bolt 4. This allows easy assembling, and the work efficiency of the assembly work is improved.

Further, by fixing the leveling device 3 to the air rail 2, preload is applied on the disc spring group 31 of the leveling device 3. Accordingly, the air rail 2 can be attached to the base frames 1 only by screwing the hexagon socket head bolts 4 into the T-nuts fewer times in comparison with the case where the disc spring group 31 has not been preloaded.

Further, by fixing the leveling device 3 to the air rail 2, the upper surface 331 of the spring guide 33 is pushed in to the same level as the upper surface 346 of the housing 34, and preload is applied on the disc spring group 31. Accordingly, it is possible to apply equal preload on the four leveling devices 3 used for fixing the air rail 2 to the base frames 1 without performing troublesome preload adjustment.

Further, the air rail 2 is fixed to the base frames 1 by inserting the hexagon socket head bolts 4 into the height-adjustment bolt holes 23 from the side of the transportation surface 21 of the air rail 2 and by screwing the hexagon socket head bolts 4 into the T-nuts 5 respectively. And, adjustment of the height of the air rail 2 relative to the base frames 1 is performed by adjusting the degree of screwing of each hexagon socket head bolt 4. As a result, differently from the substrate transportation apparatus described in the Patent Document 1, it is not necessary to ensure gaps for height adjustment at both sides of the air rail 2 in the longitudinal direction (X direction in FIG. 1). Accordingly, in the case where a plurality of air rails 2 are arranged, interval between air rails 2 can be flexibly set considering floating stability and the like of transportation objects. For example, adjacent air rails 2 can be laid in contact. As a result, it is possible to transport objects in a more stable floating state.

Further, the bolts 6 are screwed into the threaded holes 26 formed in the back surface 24 of the air rail 2 via the through-holes 347 formed in the housing 34 of the leveling device 3, so that the leveling device 3 is fixed to the air rail 2 in a state that the disc spring group 31 is preloaded. Thus, prior to fixing air rails 2 to the base frames 1, it is possible to perform fixing work of leveling devices 3 to the required number of air rails 2 and preloading work. Thus, work efficiency is improved furthermore.

Although, in the present embodiment, the hexagon socket head bolts 4 and the T-nuts 5 are used to fix the air rail 2 to the base frames 1 via the leveling devices 3, the present invention is not limited to this. For example, in the upper surface 12A of the base frame 1 at a position corresponding to the height-adjustment bolt hole 23 of the air rail 2, there may be formed a threaded hole into which the threaded portion 42 of the hexagonal socket head bolt 4 can be screwed, so as to fix the air rail 2 to the base frame 1 without using the T-nut 5.

Further, in the present embodiment, the hexagon socket head bolts 4 are used so that the hexagon wrench 7 can be used from the side of the transportation surface 21 of the air rail 2 so as to perform fixing of the air rail 2 to the base frames 1 and leveling of the transportation surface 21. However, the present invention is not limited to this. It is possible to employ bolts appropriate to a tool used. For example, it is possible to employ a bolt having a slot or cross slot formed in the upper surface of its head.

Further, in the present embodiment, the air rail 2 is fixed to the base frames 1 so as to bridge between two base frames 1 of rectangular columns laid side by side with a given space. However, the present invention is not limited to this. For example, the air rail 2 may be put on and fixed to a sheet of plate-like base frame 1.

The present embodiment has been described taking an example of application to a floating transportation apparatus having a transportation platform 100. However, the present invention can be applied to another apparatus provided with a table that has a leveling-target surface and is fixed to a base member.

Further, the present embodiment has described the leveling devices 3 that support the air rail 2 on the base frames 1 and adjusts the height of the air rail 2 relative to the base frames 1. The present invention, however, can be widely applied to interval adjustment devices for adjusting an interval between two members.

INDUSTRIAL APPLICABILITY

The present invention can be applied to fields that require good workability of adjustment of an interval between two members, such as leveling work in an apparatus in which a member having a leveling-target surface is fixed to another member. For example, can be mentioned a transportation apparatus in which a rail having a leveling-target surface is fixed to a base member, and an apparatus in which a table having a leveling-target surface is fixed to a base member.

REFERENCE SIGNS LIST

1: base frame; 2: air rail; 3: leveling device; 4: hexagon socket head bolt; 5: T-nut; 6: bolt; 7: hexagon wrench; 11: T-shaped groove; 12A-12D: outer surface of base frame 1; 13, 14: end face of base frame 1; 21: transportation surface; 23: height-adjustment bolt hole; 24: back surface of air rail 2; 25: step; 26: threaded hole; 27: small-diameter portion of height-adjustment bolt hole 23; 28: large-diameter portion of height-adjustment bolt hole 23; 31: disc spring group; 32: presser; 33: spring guide; 34: housing; 41: head portion; 42: threaded portion; 43: hexagon socket; 51, 53: end face of T-nut 5; 52: step; 54: threaded hole; 100: transportation platform; 111: groove bottom of T-shaped groove 11; 112: groove edge of T-shaped groove; 113: step; 311: disc spring; 321: upper surface of presser 32; 322: first edge portion; 323: bottom surface of presser 32; 324: stepped through-hole; 325: circular-cylinder portion; 326: under surface of first edge portion; 327: large-diameter portion of stepped through-hole 324; 328: small-diameter portion of stepped through-hole 324: 329: step surface between large-diameter portion 327 and small-diameter portion 328 of stepped through-hole 324; 331: upper surface of spring guide 33; 332: flange portion of spring guide 33; 333: bottom surface of spring guide 33; 334: through-hole; 335: circular-cylinder portion of spring guide 33; 336: under surface of flange portion 332; 337: hollow portion of tubular shape; 339: outer peripheral surface of circular-cylinder portion 335; 341, 344: opening portion of housing 34; 342: second edge portion of housing 34; 343: tubular portion of housing 34; 345: inner surface of housing 34; 346: upper surface of housing 34; 347: through-hole; 348: bottom surface of housing 34; 349: flange portion of housing 34; 350: upper surface of second edge portion; 411: upper surface of head portion 41 of hexagon socket head bolt 4; 412: seating surface of hexagon socket head bolt 4; and 421: tip of threaded portion 42.

The invention claimed is:

1. An interval adjustment device, which is placed between two members for adjusting an interval between the two members, comprising:

an elastic body, which expands and contracts in a direction of the interval;

a presser of a tubular shape, which comprises: a stepped through-hole formed from one end face toward other end face to have a large-diameter portion on a side of the one end face and a small-diameter portion on a side of the other end face; and a first edge portion formed outward on the side of the one end face;

a guide member of a tubular shape, which comprises: a columnar portion having a through-hole formed to run from one end face to other end face, a side of the other end face being inserted into the large-diameter portion of the stepped through-hole; and a flange portion formed outward at the one end face of the columnar portion; and a housing of a tubular shape, in which a second edge portion is formed inward at one opening portion;

and wherein:

the housing is placed between the two members such that other opening portion on an opposite side to the one opening portion faces one member between the two members;

the presser is housed in the housing such that the first edge portion is in contact with the second edge portion and the other end face of the presser projects from the one opening portion of the housing to abut against the other member between the two members;

the side of the other end face of the columnar portion of the guide member is inserted into the large-diameter portion of the stepped through-hole of the presser housed in the housing, so that an axis of the through-hole coincide with an axis of the stepped through-hole, and a hollow portion of a tubular shape is formed by an inner surface of the housing, a side surface of the guide member, the first edge portion, and the flange portion; and the elastic body is placed in the hollow portion so that the guide member is biased in the direction of being pushed out from the other opening portion of the housing so as to be pressed against the one member between the two members.

2. An interval adjustment device according to claim 1, wherein:

one of the two members is a support object;

other of the two members is a base; and the interval adjustment device is a leveling device for supporting the support object on the base and for adjusting height of the support object relative to the base.

3. An interval adjustment device according to claim 2, wherein:

an interval-adjustment bolt hole is formed in the support object; and the interval adjustment device further comprises a bolt, which is inserted from a side of a transportation surface of the support object, the transportation surface being on an opposite side to a side on which the interval adjustment device is located, through the interval-adjustment bolt hole, the through-hole and the small-diameter portion of the stepped through-hole, and screwed into the base, in order to fix the support object and to adjust the interval.

4. An interval adjustment device according to claim 3, wherein:

a bolt insertion through-hole is formed in the housing so as to fix the interval adjustment device to a back surface of the support object, the back surface being opposite to the transportation surface of the support object; and the guide member is pushed into the housing and preload is applied to the elastic body when the interval adjustment device is screwed to the back side of the support object.

5. An interval adjustment device according to claim 4, wherein:

an allowance for adjustment of the interval by the bolt is within a smallest length among a length from the one opening portion of the housing to the other end face of the presser in a state that the preload is applied to the elastic body, a length from the other end face of the guide member to a step surface between the large-diameter portion of the small-diameter portion of the stepped through-hole of the presser in the state, and a maximum shrinkage of the elastic body.

6. A floating transportation apparatus, which makes a transport object float away from a transportation surface, comprising:

a base;

an air rail, which has the transportation surface and a through-hole formed for inserting a bolt from the transportation surface toward an opposite surface to the transportation surface, and for fixing a head of the bolt at a position between the transportation surface and the opposite surface to the transportation surface; and the interval adjustment device according to claim 2, which supports the air rail as the support object on the base.

7. A floating transportation apparatus, which makes a transport object float away from a transportation surface, comprising:

a base;

an air rail, which has the transportation surface and a through-hole formed for inserting a bolt from the transportation surface toward an opposite surface to the transportation surface, and for fixing a head of the bolt at a position between the transportation surface and the opposite surface to the transportation surface; and the interval adjustment device according to claim 3, which supports the air rail as the support object on the base.

8. A floating transportation apparatus, which makes a transport object float away from a transportation surface, comprising:

a base;

an air rail, which has the transportation surface and a through-hole formed for inserting a bolt from the transportation surface toward an opposite surface to the transportation surface, and for fixing a head of the bolt at a position between the transportation surface and the opposite surface to the transportation surface; and the interval adjustment device according to claim 4, which supports the air rail as the support object on the base.

9. A floating transportation apparatus, which makes a transport object float away from a transportation surface, comprising:

a base;

an air rail, which has the transportation surface and a through-hole formed for inserting a bolt from the transportation surface toward an opposite surface to the transportation surface, and for fixing a head of the bolt at a position between the transportation surface and the opposite surface to the transportation surface; and the interval adjustment device according to claim 5, which supports the air rail as the support object on the base.

* * * * *